(No Model.)
A. C. SMITH.
BOX FOR STOP COCKS OF SERVICE PIPES AND VALVES.
No. 455,415. Patented July 7, 1891.
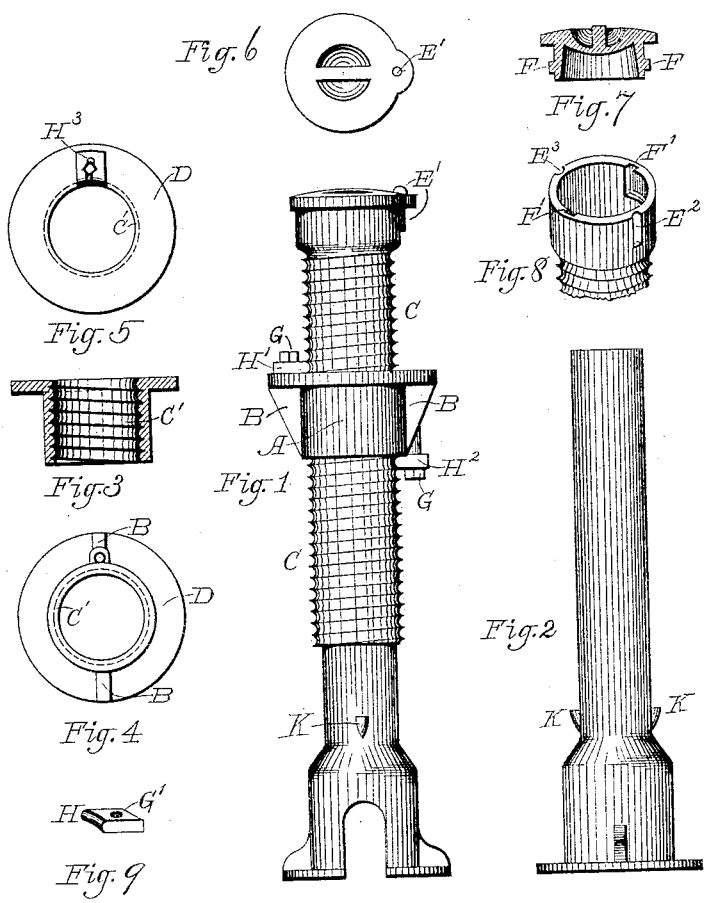

UNITED STATES PATENT OFFICE.

ALVIN C. SMITH, OF JACKSON, MICHIGAN.

BOX FOR STOP-COCKS OF SERVICE PIPES AND VALVES.

SPECIFICATION forming part of Letters Patent No. 455,415, dated July 7, 1891.

Application filed September 11, 1890. Serial No. 364,701. (No model.)

*To all whom it may concern:*

Be it known that I, ALVIN C. SMITH, of the city and county of Jackson, State of Michigan, United States of America, have invented certain new and useful Improvements in Boxes for Stop-Cocks of Service Pipes and Valves; and I do hereby declare that the following is a full, clear, and exact description of the invention, which will enable others skilled in the art to which it appertains to make and use the same, reference being had to the accompanying drawings.

I am aware that a great variety of valve-boxes for service-pipes exists; but in all of them there are objectionable features that in many instances make them almost inoperative or to a great extent destroys their utility. The screw, as heretofore applied to the upper and lower sections, as working upon threads or lug, often by the action of water becomes adhered, or, on account of sand, obstructed, and cannot be made to work one within the other, and when subjected to a heavy pressure from above are driven down upon the service-pipe, fracturing the standards of the lower section and injuring the service-pipe itself. Often, also, by the heaving of the ground on account of frost and the two sections adhering together the lower section is drawn out of place and the facility of reaching the stop-cock greatly impeded, if not entirely prevented. Again, the application of the cover through former devices has been unsatisfactory by reason of its insecure locking. In my invention I claim to have overcome these imperfections, as will more fully appear by a careful examination and application of my devices.

The following is a brief description of the several views of the drawings:

Figure 1 is a vertical section of the entire valve-box. Fig. 2 is a vertical section of the lower section. Fig. 3 is a side view of the nut upon the outside of the upper section, showing the thread upon which it works. Fig. 4 shows top view of the nut A. Fig. 5 shows the same with the application of piece of iron to clean threads on outside of section C. Fig. 6 shows top of cover. Fig. 7 shows vertical view of cover. Fig. 8 shows partial top and side view of section C, relating to application of cover and bolt. Fig. 9 shows a view of the nut for cleaning the threads on section C.

Similar letters refer to similar parts throughout the several views.

The following is a detailed description of said invention:

Fig. 1 represents a side view of the box, showing both upper section C and lower section in place and upon the upper section the nut A, intended to raise and lower the upper section C, which nut is strengthened by the wings B, which prevents a rotary motion of the upper section C. It also shows the bolts G, which screw into the nuts A and hold in position a small piece of iron. (Shown in Fig. 9 as H and marked in Fig. 1 as $H'$ and $H^2$.) The purpose of the pieces is to clean the screw from dirt when section C is raised or lowered, the piece H following the depression in the thread of the screw. $E'$ in Fig. 1 represents a pin, which passes through the cover (shown in Fig. 6) and enters a slot on the top of section C, so as to prevent the cover from turning, and thereby making a sure fastening.

Fig. 2 represents a side view of the lower section of the box, which slides within the upper section C.

Fig. 3 represents the nut A, showing an inside section. $C'$ shows the thread of the screw within the nut A. D represents the projection on nut A.

Fig. 4 represents top view of the nut A.

Fig. 5 represents the top of the nut A, showing the adaptation of the bolt G and the piece $H^3$ to the nut A, for the purposes hereinbefore stated.

Fig. 6 shows the top of the cover. E represents a hole for the pin, which pin is intended to enter a slot on the top of the upper casing C, as shown in Figs. 1 and 8.

Fig. 7 represents a side view of the cover, showing lugs F on the lower part of the cover.

Fig. 8 represents the top part of the section C, showing slots $F'$, which receive the lugs F. (Shown in Fig. 7.) This slot runs in the inside of the top of the section C a distance of about one-half an inch, where it turns at right angles and runs about two inches, so that the lugs F may be inserted in the slots $F'$ and pressed down until they reach the slots running at right angles thereto. Then when the cover is turned the lugs F pass into the last-named slots, thus preventing the cover from rising, and when the hole E comes opposite the groove or slot E² the pin E' is then inserted, and thereby the cover is secured in place.

What I claim is—

1. In a stop-box for service pipe and valve boxes, the combination of the nut A, placed upon the outside of section C, constructed in the inside, as hereinbefore set forth, to turn upon the thread shown upon the outside of section C for the purpose of raising or lowering said section C, with the wings B and bolt G and the piece of iron H, for the purpose hereinbefore set forth.

2. In valve-boxes for service-pipes, the cover having the hole for the bolt E and the bolt E', in combination with the lugs F, and the slots F' and E², and section C, with the wings B, bolt G, and pieces H, sliding upon the section K, for the purpose hereinbefore set forth.

ALVIN C. SMITH.

In presence of—
CHAS. B. WOOD,
MAI MANIATES.